3 Sheets—Sheet 1.

W. H. & A. McCORMICK.
Refrigerator.

No. 216,204.  Patented June 3, 1879.

Witnesses,

Thomas J. Bewley
George C. Hetzel

Inventor

William H. McCormick
Aaron McCormick
per Stephen Ustick attorney

N. PETERS, PHOTO-LITHOGRAPHER, WASHINGTON, D. C.

W. H. & A. McCORMICK.
Refrigerator.

No. 216,204.     Patented June 3, 1879.

Witnesses.
Thomas J. Bewley
George C. Hetzel

Inventor
William H. McCormick
Aaron McCormick
per Stephen Ustick, Attorney

W. H. & A. McCORMICK.
Refrigerator.

No. 216,204. Patented June 3, 1879.

Witnesses
Thomas J. Bexley
George C. Hotzel

Inventor
William H. McCormick
Aaron McCormick
per Stephen Ustick Attorney

UNITED STATES PATENT OFFICE.

WILLIAM H. McCORMICK AND AARON McCORMICK, OF PHILADELPHIA, PA.

IMPROVEMENT IN REFRIGERATORS.

Specification forming part of Letters Patent No. 216,204, dated June 3, 1879; application filed May 18, 1878.

*To all whom it may concern:*

Be it known that we, WILLIAM H. McCORMICK and AARON McCORMICK, of the city and county of Philadelphia, in the State of Pennsylvania, have invented a new and useful Improvement in Freezers, of which the following is a specification.

Our invention belongs to that class of freezers which are used for freezing fish and game.

The principal object of our invention is the attainment of a thorough and uniform freezing throughout every part of the freezer with a minimum amount of ice and salt, and such an arrangement of the ice-pans and the fish and game trays as admits of their being conveniently placed in their position in the freezer or removed therefrom by the workmen from the outside of it.

The nature of the invention consists of a freezer having a series of compartments side by side, with ice-pans and one or more fish and game trays between them in the upper part of the freezer, and a series of fish and game trays in the lower part, the upper part being closed by means of hinged doors, to admit of an easy access, but the lower part covered by means of a stationary shutter, about the height of the lower series of trays, to prevent the escape of the cold air from these trays when the doors are opened.

To admit of an easy removal of the trays from these covered parts and of their return to them, they are provided with friction-wheels, which roll on inclined ways, as hereinafter fully described.

Figure 1:
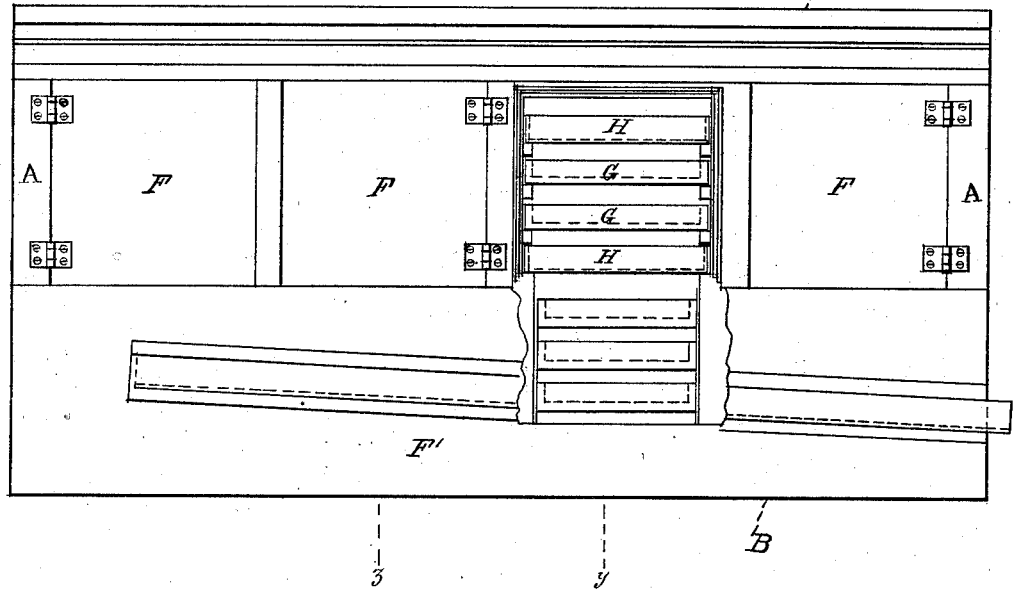
Figure 2:
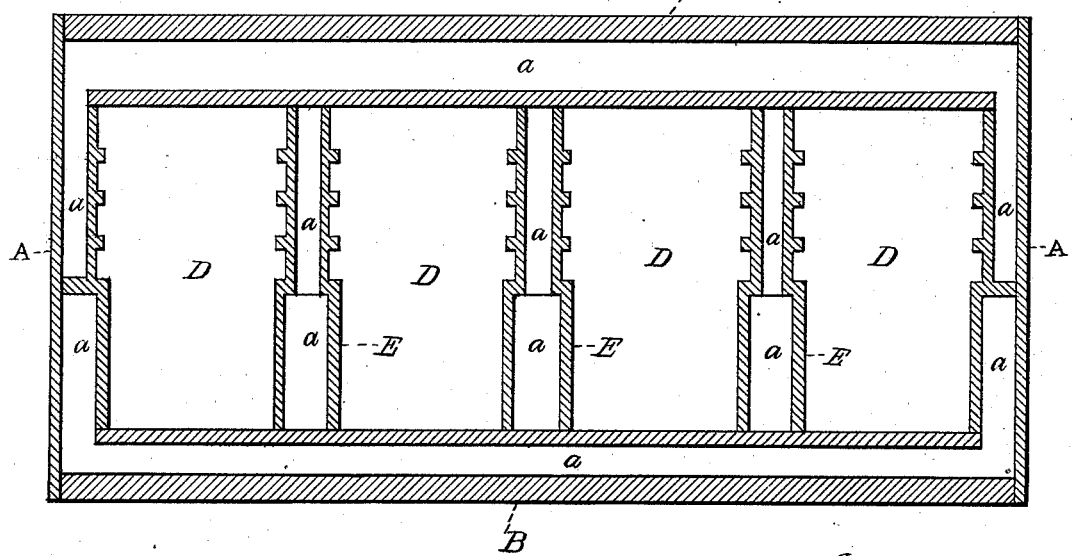
Figure 3:
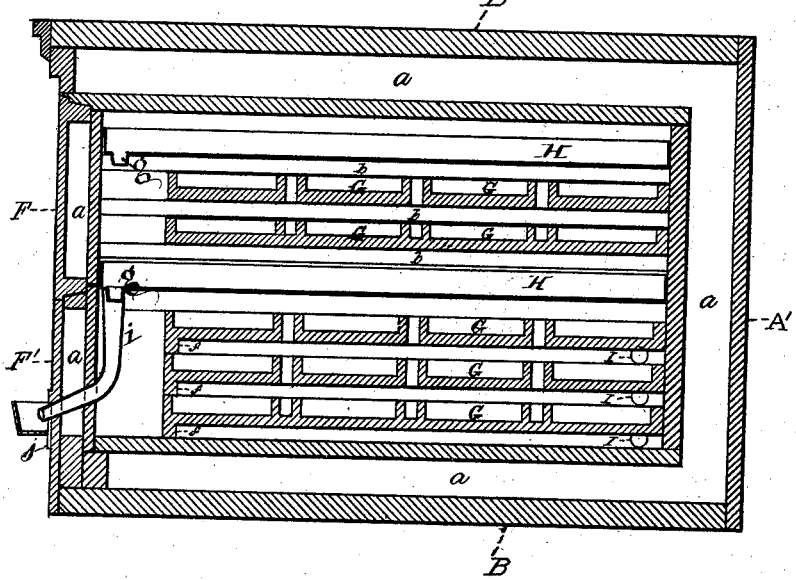
Figure 4:
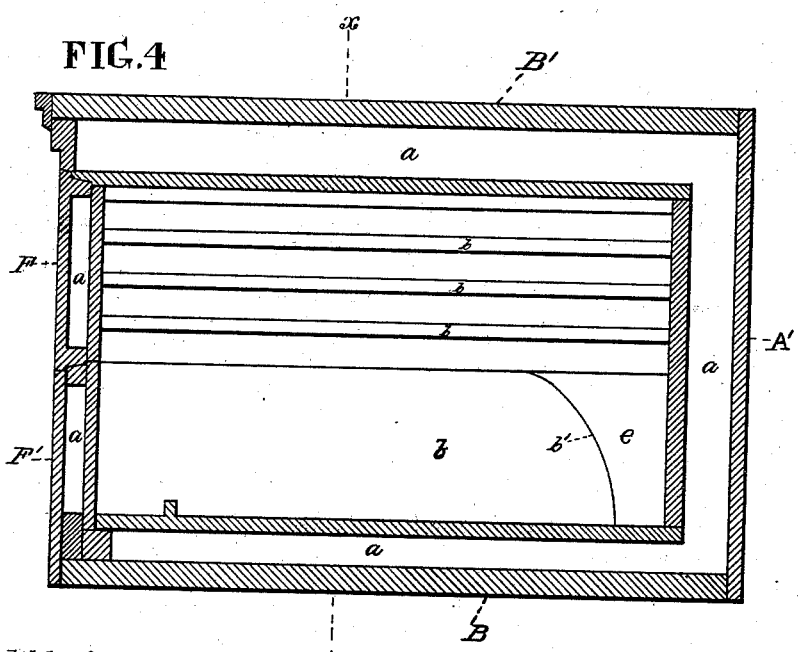
Figure 5:
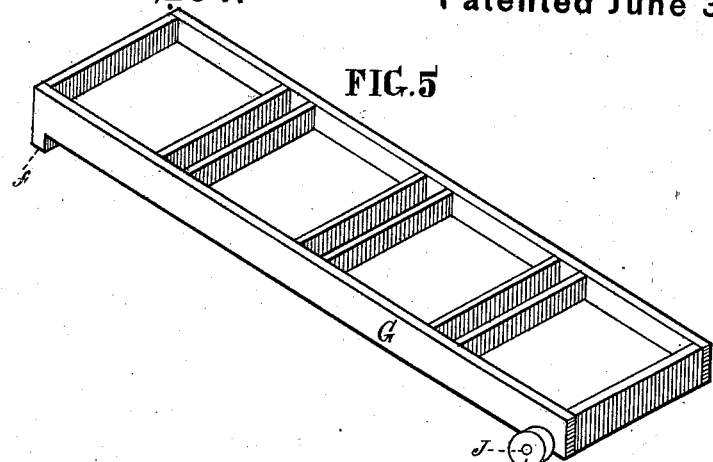
Figure 6:
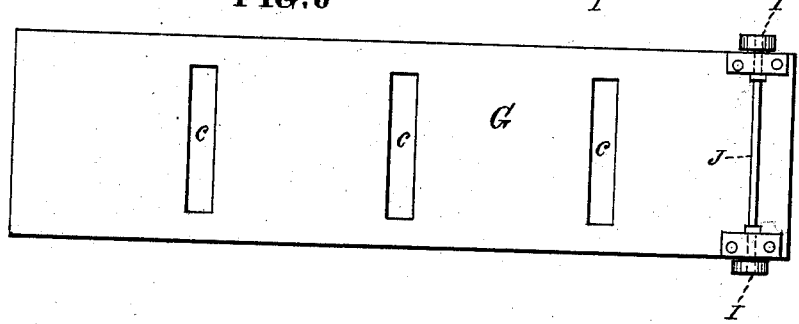
Figure 7:
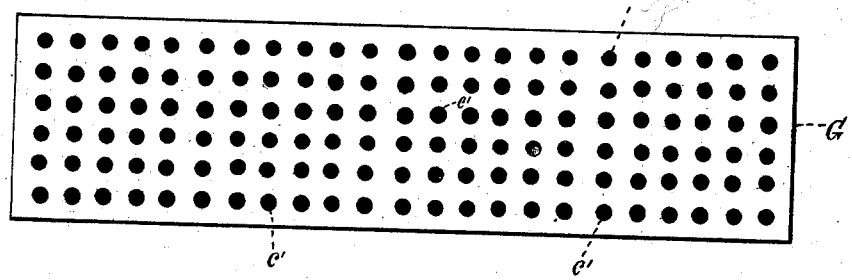

In the accompanying drawings, Figure 1 is a front elevation of our improved freezer, with one of the doors F removed and part of the cover or shutter F' broken away to show the construction of the interior of the freezer. Fig. 2 is a longitudinal vertical section at the broken line $x$ $x$ of Fig. 4, the trays and ice-pans being removed. Fig. 3 is a cross-section at the line $y$ $y$ of Fig. 1. Fig. 4 is a like section at the line $z$ $z$ of Fig. 1, the ice-pans and trays being removed. Fig. 5 is a perspective view of one of the trays G. Fig. 6 is a bottom view of the same. Fig. 7 is a bottom view, showing a perforated, instead of a slotted, bottom, the wheels I and shaft J being left off to show either an upper or a lower tray.

Like letters of reference in all the figures indicate the same parts.

A A represent the end walls of the freezer; A', the rear wall; B, the bottom, and B' the top.

The freezer is divided into a plurality of compartments, D, by means of the partitions E, which are closed at their upper part by means of the hinged doors F, and below the doors by means of the permanent shutter F'. The upper part of the partitions E have ledges $b$, for the support of the fish and game trays G and ice-pans H. Two trays are represented in the drawings between two ice-pans; but a fewer or greater number may be used.

In the lower part of the compartments three trays are shown, one above another; but their number may also be varied. The bottom of the lowest tray in each series is solid, as well as that in each upper series; but the upper ones in each upper and lower series are slotted or perforated, the slots and perforations being indicated, respectively, by letters $c$ and $c'$ in Figs. 6 and 7, to provide for the free passage of cold air downward as it descends from the ice-pans.

To provide for placing the lower series of trays in each compartment in their places, and removing them therefrom when necessary, they are provided at their rear side with friction-wheels I on the shafts J, and the compartments have boards $d$, which are curved at their rear ends to form inclined ways $b'$, leaving recesses, to admit of the wheels running down the inclines when the trays are pushed toward the rear of the refrigerator to bring the trays into their position, or of running up the same in the removal of the trays, the latter being held in their horizontal position by the operator having hold of their fronts.

If desired, a suitable implement may be used instead of the hands for taking hold of the front of the trays for placing the latter in the refrigerator or removing them therefrom.

In order to have these trays held in a horizontal and steady position, there are strips $f$ at their fronts, equal in depth to the projection of the wheels I below the bottoms of the trays.

The operation is as follows: The trays G, being filled with fish and game, are placed in position, as seen in Figs. 1 and 3, and the ice-pans H, containing ice and salt, are also arranged as shown, and the front of the freezer is then closed. The ice in the upper pan soon cools the air, and has a direct effect upon the contents of the trays beneath, and then mixes with the cold air from the lower ice-pan and descends to the lower trays. The cold air, in descending until it reaches the bottom of the freezer, takes the place of the air of higher temperature, whereby a complete commingling of the air takes place from the top to the bottom of the freezer, producing a uniform temperature; and by continuing the cooling process until the freezing-point is attained, the contents of the trays may be perfectly and uniformly frozen throughout every part of the freezer.

We have discovered by practical operation that on account of the horizontal arrangement of the ice-pans, whereby the cold air is equally distributed upon the fish and game beneath the pans, there is no difficulty in freezing in the trays farthest removed from the pans perfectly and evenly, and with a much less quantity of ice and salt than is found necessary with other freezers.

The upper ice-pans have outlets $g$ for the passage of the drippings, which fall into the lower pans; and these have spouts $h$, which connect with the chutes $i$, the lower ends of which pass through the shutter F', as seen in Fig. 3, for carrying the drippings into the trough K on the front of the shutter, which conveys them from the freezer. The trough may be permanently fastened to the shutter by means of screws, or otherwise, passing through the flanges $j\,j$; or it may be hung in any convenient manner to it, so as to be conveniently detached when desired.

We claim as our invention—

1. In a freezer, the horizontal ways $b$, having inclined extensions $b'$, in combination with the freezer-case and the lower fish and game trays, G, having friction-wheels I, substantially in the manner and for the purpose set forth.

2. In combination with a freezer-case having at its lower part a permanent shutter, F', and horizontal ways $b$, with inclined extensions $b'$, the ice-pans H, and fish and game trays G, the lower trays having friction-wheels I, substantially as and for the purpose set forth.

WILLIAM H. McCORMICK.
AARON McCORMICK.

Witnesses to the signature of William H. McCormick:
STEPHEN USTICK,
THOMAS J. BEWLEY.

Witnesses to the signature of Aaron McCormick:
JOHN G. HILL,
JONAS S. RICE.